United States Patent [19]

Rigby

[11] 4,440,713
[45] Apr. 3, 1984

[54] PROCESS FOR MAKING FINE MAGNETIC FERRITE POWDER AND DENSE FERRITE BLOCKS

[75] Inventor: Eugene B. Rigby, Tucson, Ariz.

[73] Assignee: International Business Machines Corp., Armonk, N.Y.

[21] Appl. No.: 429,645

[22] Filed: Sep. 30, 1982

[51] Int. Cl.³ .................. C01G 49/00; C04B 33/32
[52] U.S. Cl. .................................. 264/325; 423/594; 252/62.56
[58] Field of Search ............ 423/594; 252/62.56; 264/325

[56] References Cited

U.S. PATENT DOCUMENTS

| | | |
|---|---|---|
| 2,636,892 | 4/1953 | Mayer . |
| 2,762,777 | 9/1956 | Went et al. ............... 423/594 |
| 3,828,101 | 8/1974 | Miklas ...................... 423/594 |
| 3,873,461 | 3/1975 | Mollard et al. ............ 252/62.56 |
| 3,994,819 | 11/1976 | Mollard et al. ............ 423/594 |
| 4,006,734 | 2/1977 | Eadie et al. ............... 423/594 |
| 4,049,789 | 9/1977 | Manabe et al. ............ 423/594 |
| 4,096,080 | 6/1978 | Mollard et al. ............ 252/62.56 |
| 4,175,117 | 11/1979 | Hill ......................... 423/594 |

FOREIGN PATENT DOCUMENTS 53-19794  6/1978  Japan ...................... 423/594
53-37560  9/1978  Japan ...................... 423/594

OTHER PUBLICATIONS

Economos, "J. of the Amer. Ceramic Soc.", vol. 38, 1955, pp. 241-244.
Robin, "Bull. Soc. Chim. France", No. 223 (11-12), 1953, pp. 1078-1084.

Primary Examiner—Herbert T. Carter
Attorney, Agent, or Firm—J. A. Pershon

[57] ABSTRACT

A manufacturing process for making a finer ferrite powder which can then be used to make a very dense block of the ferrite ceramic. The process for making the powder includes the steps of co-precipitation of an aqueous solution of metal ions and an ammonium oxalate solution. The co-precipitation particles are separated, washed and dried. The particles are low-temperature calcined and then vibro-energy or ball milled and dried. The particles are fluffed and broken up in a blender and pressed into a mold for sintering and pressing in a hot isostatic press procedure. The ferrite blocks are then post annealed in an oxygen atmosphere and cooled to form a dense magnetic ceramic particle. Preferably the process is for use in the production of nickel-zinc ferrite used for magnetic heads.

18 Claims, 1 Drawing Figure

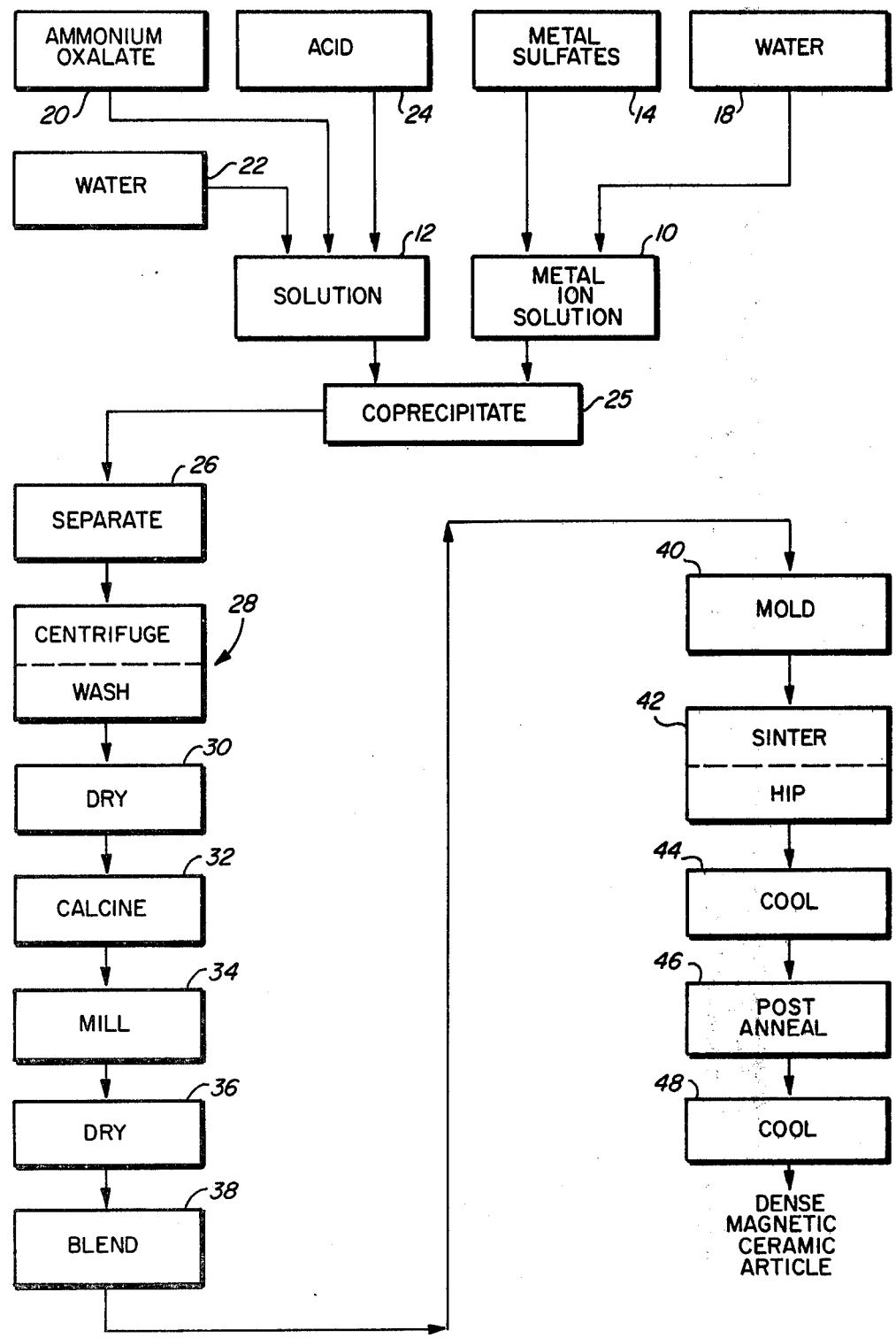

PROCESS FOR MAKING FINE MAGNETIC FERRITE POWDER AND DENSE FERRITE BLOCKS

FIELD OF THE INVENTION

This invention relates generally to a method for making ferrite ceramic particles and components and, in particular, to an improved method for making magnetic ferrite components for use in the manufacture of magnetic heads.

BACKGROUND OF THE INVENTION

The process steps conventionally used for the manufacture of ferrite ceramics, such as manganese-zinc ferrites and nickel-zinc ferrites, have been established for many years. In such conventional processes for the manufacture of polycrystalline ferrites, measured amounts of metal oxides or metal carbonates are mixed together and pulverized. The pulverized materials are calcined at temperatures up to 1000° C. to initiate solid-state diffusion and formation of the desired spinel-type crystal structure. Further milling prepares the powder suitable for pressure compaction into components which are sintered and then further densified in a hot press procedure. Because the starting materials are dry, such procedure has been termed a "dry" process for the manufacture of ferrite components. Certain limitations are inherent in such dry processing of materials. The desired homogeneity is limited by mechanical mixing and pulverizing. Precise product composition is difficult with such dry processing. The impurity content is not readily controllable.

The "dry" process was replaced by a "wet" process wherein the constituents of the ferrites are co-precipitated from solution. Better homogeneity resulted. Precipitation from a solution made from metal salts in itself is not sufficient to overcome deficiencies. It is known to use carbonate or hydroxide constituents for the co-precipitation of the metal particles. The ferrite particles produced were sufficient in density and homogeneity to produce a workable ferrite ceramic for magnetic heads. However, the ferrite powder and the resultant ferrite blocks produced were not dense enough for use in magnetic heads to reproduce the higher frequency recording information required of present day technology. The former processes produced a small amount of impurities and voids in the resultant ferrite blocks, but these impurities and voids were significant, especially in the deposition of thin film layers of material used in the transducers of higher technology magnetic heads.

DESCRIPTION OF THE PRIOR ART

Co-precipitation methods for the manufacture of ferrite powder which can then be compacted into magnetic ceramic blocks are known. The U.S. Pat. No. 4,097,392, issued to A. Goodman, et al, discloses a manufacturing process for producing magnetic ceramic cores using a "wet" process for the compositional preparation of the materials. The metal ions are co-precipitated as a mixture of carbonate and hydroxides, which are very gelatinous. A high temperature calcining process is used to convert the precipitate to a ferrite powder. The calcine is performed at 500° C. to 800° C. to change the material from an amorphous to a crystalline structure. The powders are then compacted and sintered.

It is, therefore, an object of the present invention to provide a method of making ferrite powder which involves one precipitating agent.

Another object of the present invention is to provide a method of forming a fine ferrite powder by using a low temperature calcining process.

It is known to precipitate an oxalate or oxalates from a solution of the corresponding sulphate or sulphates and then to decompose the oxalate or oxalates to metal as stated in U.S. Pat. No. 2,636,892. The patent describes a process for making a metal or metal oxide comprising the step of precipitating the oxalate of the metal by means of oxalic acid from the solution of the sulphate at a temperature between 40° C. and 90° C. in the presence of a mild organic reducing agent and of sulphuric acid sufficient to bring the pH of the solution to a value not exceeding 3.

Yet another object of this invention, therefore, is to provide a method of making ferrite powders which use ammonium oxalate to produce a finer metal oxide powder and which does not require an organic material for precipitate control.

The U.S. Pat. No. 4,175,117, issued to B. Hill, relates to the production of ceramic powders which are then ball milled and placed into a hot isostatic press to compact the powder into ferrite blocks.

It is, therefore, a further object of the present invention to provide a method of forming dense magnetic ferrite ceramic blocks from co-precipitated metal oxalates calcined at a low temperature for conversion to a ferrite powder, milled to reduce the particle size, molded and then sintered and densified using a hot isostatic press procedure.

SUMMARY OF THE INVENTION

In accordance with the present invention, a process for making a fine ferrite powder which can then be used to make a dense block of ferrite ceramic includes the steps of co-precipitation by adding an ammonium oxalate precipitating agent to an aqueous solution of metal ions formed by dissolving pure metal sulfates in water or, as an alternative, dissolving pure metals in acid. The co-precipitate step is followed by a low temperature calcine process step. The resultant particles are milled and then isostatically compacted. The compacted molds are then presintered and hot isostatically pressed into blocks.

It is, therefore, a primary object of the present invention to provide an enhanced process for forming a fine ferrite powder.

According to a particular feature of the present invention, a process is provided for making a fine ferrite powder comprising the steps of forming a solution of ammonium oxalate as a precipitating agent and forming an aqueous solution of metal ions by dissolving pure metal sulfates in water and adding the precipitating agent solution to the metal ion solution as a co-precipitation step. The next step is the separating of the liquid from the metal oxalate precipitate. The metal oxalate precipitate is then washed to remove excess ammonium oxalate and the acid contaminants. The next step is to dry the washed metal oxalate slurry and then to low temperature calcine the dried metal oxalate slurry. The calcined powder is then milled, dried and blended to break up the dried ferrite powder. The ferrite powder, made according to these steps, can then be formed into bricks by compacting the powder, using a hot press method, or preferably by compacting the powder into molds by isostatic pressure and then presintering and hot isostatically pressing the molded pieces to approximate theoretical density.

It is, therefore, another object of the present invention to provide a process for forming a dense ferrite brick material.

Yet another object of the present invention is to provide a co-precipitation process, together with a low temperature calcine process, to form a fine magnetic ferrite powder.

These and other objects of the present invention will become apparent to those skilled in the art as the description proceeds.

BRIEF DESCRIPTION OF THE DRAWING

The various novel features of this invention, along with the foregoing and other objects, as well as the invention itself, both as to its organization and method of operation, may be fully understood from the following description of illustrated embodiments when read in conjunction with the accompanying drawing, wherein the FIGURE is a flow chart of a process for making ferrite bricks using the steps of the present invention.

DESCRIPTION OF THE PREFERRED EMBODIMENTS

To prepare ferrite blocks with the proper magnetic and physical properties, it is necessary to achieve intimate mixing of the constituents as well as maintaining absolute chemical control. This invention relates to a process for making a finer ferrite powder which can then be used to make a more dense brick of the ferrite. Homogeneity is increased in the ferrite powder made according to the present invention, both in chemistry and microstructure. The homogeneity is extremely critical in every step of the process for making the powder, as well as in the process for compacting the bricks because homogeneity controls the final chemical and magnetic properties of the ferrite, both as a powder and a brick.

The steps for carrying out the teaching of the invention in the manufacture of nickel-zinc ferrite are shown schematically in the FIGURE. Two separate solutions are prepared, the solution of metal ions 10 and the ammonium oxalate solution 12. High purity metal sulfates are provided from source 14 to produce the ferrite powder. The basic chemicals are received either in granular or crystalline form. All of the ingredients are weighed and agitated into the solution with either mechanical or magnetic stirring equipment. Metal sulfates together with water from source 18 produces an aqueous solution of ferrous ions and divalent ions of nickel and zinc. Preferably the metal ions are added as a metal sulfate with the following configuration and weight percentage:

about 66% to about 72% $FeSO_4.7H_2O$,
about 16% to about 23% $ZnSO_4.7H_2O$,
about 5% to about 18% $NiSO_4.6H_2O$, these being the weight percentages of metal sulfates utilized based on the total weight to produce a ferrite having the following percentages:

about 50% ferric oxide,
about 2% to about 9% ferrous oxide,
about 31% to about 36% zinc oxide, and
about 10% to about 15% nickel oxide.

The metal sulfates are dissolved with deionized water from source 18 to form the metal ion solution 10. The aqueous metal ion solution 10 is stirred and heated to completely dissolve all ingredients into a clear solution. The metal ion solution 10 is heated to 50° C.±5° C. Too high a temperature causes the solution to become opaque. The aqueous solution of metal ions is formed to have a concentration of metal ions ranging from about 1.4 to about 1.6 moles per liter.

As an alternative, pure metals may be used and dissolved in an acid such as sulfuric acid and water to form the metal ion solution 10. Sulfuric acid can be added from a source to dissolve the metals. Then, together with the deionized water from source 18, can produce the aqueous solution of ferrous ions and divalent ions of nickel and zinc in the metal ion solution 10.

The solution 12 is obtained by mixing an ammonium oxalate from source 20 to deionized water from source 22. Sulfuric acid from a source 24 is added after the aqueous ammonium oxalate solution is heated to 70° C.±5°. The sulfuric acid is added to adjust the pH of the solution 12 to 3±0.2. The solution is then heated further to 95° C.±5° C. The solution 12 is a colorless clear solution. The portions selected to form the solution 12 are about seven parts by weight water to one part of ammonium oxalate as $(NH_4)_2C_2O_4.H_2O$.

Oxalic acid has been used to make metal oxide powders, but it is difficult to obtain a uniform precipitate of the components. We have found that ammonium oxalate produces a more homogeneous mixture and a finer powder. It is not known why the ammonium oxalate produces a better metal powder, but it is our supposition that the ammonium ions produce a reaction that permits the removal of the organic material for participate control. This, in any event, produces a finer, more homogeneous metal powder that can then be calcined and hot isostatically pressed to form a very dense ferrite.

Immediately after the metal ion solution 10 and the solution 12 have reached their respective temperatures, solution 12 is added to the metal dissolve solution 10 in the co-precipitate tank 25. The solution is added as quickly as possible while the metal ion solution is continually being agitated. Immediately a yellow precipitate forms. The heat is turned off at this time and the co-precipitate mixture is allowed to cool to approximately ambient temperature during which time the co-precipitate solution of tank 25 is continually agitated. After the solution has cooled, the stirring is stopped and the precipitate is allowed to settle. The liquid above the precipitate is clear with a yellow tinge. It should not have a green color if all the metal ions have precipitated out properly. The following formula indicates that all the metal ions have co-precipitated as an intimate mixture of metal oxalate in a ratio similar to that of the dissolved metal ions in the original metal ion solution 10.

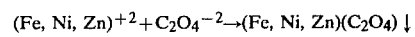

After the precipitate has settled, the supernatant liquid is poured off in a separation zone 26. The metal oxalates are now ready for washing in a zone 28.

The metal oxalates must now be washed free of excess ammonium oxalate and sulfate contaminants. This is accomplished in the preferred embodiment by the addition of deionized water, stirring the contents, separating the oxalate precipitate from the liquid wash product by centrifuge action, and finally decanting the supernatant liquid. As an alternate washing method, the precipitate is allowed to settle by standing over a period of time followed by decantation. The centrifuge has the advantage of reducing the time required for this step. The precipitate washing procedure is repeated as needed. The small amount of contaminate remaining in contact with the metal oxalates will decompose into volatile gases during a subsequent heat treatment step, such as the calcine operation.

The washed wet metal oxalate slurry is now the consistency of a flowable paste. This slurry is inserted into an air oven at approximately 100° C.±10° for a drying zone 30. The temperature is held for approximately 16±2 hours. The metal oxalate powder is now bright yellow in color with possible streaks of brown. The brown color is due to the beginning of oxalate decomposition. After the drying step in zone 30, the surface skin of the metal oxalate is disturbed. At this time, the powder is very friable and breaks up easily. The powder is then returned to the air oven and heated for four hours at approximately 200° C.±5° for the calcine zone 32. The oxalate decomposes to metal oxides and reacts to form the nickel-zinc ferrite composition. During this process the color of the powder has changed from yellow to brown. The powder loses approximately 58% of its original weight. After this heat treatment, the powder is transferred, preferably into inconel trays, and placed in a high temperature calcining oven in the calcine zone 32. It is rapidly heated in air to 800° C.±20° where it is held for approximately six hours and then cooled. During this process, the powder is transformed completely into the single phase ferrite spinel. There is also some particle grain growth. During the calcining operation, the following chemical reaction occurs.

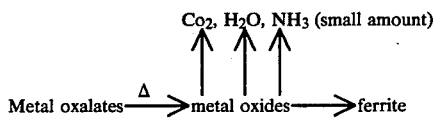

The calcined powder is then placed in a mill 34. The mill 34 can be a standard ball mill but is preferably a polyurethane lined vibro-energy mill containing dense zirconium dioxide pellets. Deionized water is added for a powder loading of 40% in this instance. The mill is agitated by means of vibro-energy milling for approximately eight hours. The ferrite powder is reduced to one micron or less in size by this action. The ferrite slurry is then washed to separate the powder from the grinding material and screened to separate any large particles or pieces of the fractured grinding media. The ferrite powder is allowed to settle to the bottom of the container and the water is decanted off, leaving a fairly thick slurry which is then transferred to an air oven 36 at approximately 100° C. for 16 hours to dry the powder. To ensure the complete formation of a fine dried ferrite powder, the powder is placed into a blender 38 after which an extremely fine, fluffy ferrite powder is recovered.

The ferrite powder is now ready for green brick formation in a mold 40. Various types of molds may be utilized to contain the powder during an isostatic pressing operation. The molded brick is then densified in a high temperature furnace 42. Preferably this densification is performed by a sintering operation in air at 1150° C. for approximately five hours. Preferably, then the sintered blocks are further densified to approximately theoretical density in a hot isostatic press procedure.

Hot isostatic pressing is a process whereby extremely high gas pressure, in conjunction with heat, is applied to a ceramic material. This combination of heat and pressure produces essentially pore-free samples. Much higher densities can be obtained by the hot isostatic press procedures than are available with normal sintering or even hot pressing techniques.

The molded pieces that are to be further compacted are placed in a bell-jar furnace, for instance. To ensure as little chemical change as possible in the nickel-zinc ferrite chemistry during the process, the samples are surrounded with a matrix of pieces of the nickel-zinc ferrite. The ferrite bricks are placed in an alumina crucible. Alumina powder and titanium shavings are placed around the crucible to act as an oxygen getter material to protect the heating elements from oxidation caused by vapors released from the ferrite brick during the heating cycle. The crucible is then placed within the furnace assembly, which is placed within the high pressure chamber of the hot isostatic press. The chamber is evacuated and back flushed with argon gas to remove all oxidizing or reducing gases.

An argon gas pressure of approximately 9±1 Kpsi is entered into the chamber. The temperature of the furnace is raised to a temperature of 1185° C.±5°. At this temperature the gas pressure climbs from 28 to 29 Kpsi. The ferrite bricks are held at this temperature and pressure between one to two hours and then cooled to ambient temperature. The gas pressure is released as the temperature approaches 200° to 300° C.

This hot isostatic press operation produces pore-free ferrite bricks that have a density close to theoretical density, that is, 99.9% of theoretical.

To equilibrate the oxygen content throughout the ferrite bricks, after the cool procedure 44, the bricks are subjected to a post-heat treatment 46 at atmospheric pressure in a pure oxygen environment. This is accomplished by placing the bricks in an alumina boat and heating the furnace to 900° C.±25° C. in an oxygen atmosphere for approximately 15 hours. The bricks are then cooled at zone 48 and the result is a dense magnetic ceramic particle.

The principles of the present invention have now been made clear in an illustrated embodiment. There will be immediately obvious to those skilled in the art many modifications of structure, arrangement, proportion, the element, materials and components used in the practice of the invention. It should be obvious that other ferrites could be made using the present invention, such as manganese-zinc ferrite without departing drastically from the process disclosed. Although a hot isostatic press procedure is preferred in the process flow, a hot press procedure itself could be substituted, again without departing from the present invention. The appended claims are, therefore, intended to cover and embrace any such modifications, within the limits only of the true spirit and scope of the invention.

What is claimed is:

1. A wet process for producing a ferrite powder comprising the steps of:
forming an aqueous metal ion sulfate solution of ferrous and zinc ions and divalent ions of one other metal in which the divalent metal ion of said one other metal is selected from the group consisting of Mn and Ni;

heating said formed metal ion solution to approximately 50° C. or less;

providing a solution containing ammonium oxalate;

heating said ammonium oxalate solution to approximately 70° C.;

reacting said metal ion solution with said ammonium oxalate solution by adding the ammonium oxalate solution into the metal ion solution to co-precipitate metal oxalates;

controlling the co-precipitate solution to have a pH from between three to about four;

separating said co-precipitated material from the liquid phase;

washing the metal oxalate precipitate to remove excess ammonium oxalate and the acid contaminants;

drying said separated co-precipitated material;

calcining the co-precipitated material in a temperature of approximately 200° C. to convert the ferrous ions to ferric ions; and milling said calcined ferric material to form a fine powder.

2. The process of claim 1 wherein the divalent metal ions is nickel to form a nickel-zinc ferrite powder.

3. A process as defined in claim 1 further including the steps of:

compacting said calcined ferrite powder to mold a brick of the powder;

pressure compacting the molded brick at an elevated temperature.

4. A process as described in claim 3 wherein the step of pressure compacting the molded ferrite powder comprises a hot isostatic press procedure raised to a temperature of approximately 1200° C. at a pressure of approximately 28 to 29 kpsi.

5. A process as described in claim 1 wherein the step of separating said co-precipitated material from the liquid phase is performed in a centrifuge and decanting the supernatant liquid.

6. A process as described in claim 1 wherein the step of milling said calcined ferric material is performed using a polyurethane lined vibro-energy mill containing dense zirconium dioxide pellets.

7. A proess for making a ferrite powder comprising the steps of:

forming a solution of ammonium oxalate as a precipitating agent;

dissolving in acid pure metals of iron and zinc and one other metal selected from the group consisting of Mn and Ni to form a metal ion solution;

heating said formed metal ion solution to approximately 50° C. or less;

adding the precipitating agent solution to the metal ion solution as a co-precipitation step;

separating the liquid from the metal oxalate precipitate;

washing the metal oxalate precipitate to remove excess ammonium oxalate and the acid contaminants;

drying the washed metal oxalate slurry;

calcining the dried metal oxalate slurry; and milling the calcined powder to form a fine ferrite powder.

8. A process as defined in claim 7 further including the steps of:

isostatically compacting said powder at an ambient temperature;

presintering said compacting powder; and hot isostatically pressing said powder to form a dense brick of ferrite material.

9. A process as defined in claim 7 wherein the step of calcining is performed at a temperature of approximately 200° C.

10. A process as defined in claim 7 wherein the divalent metal ions are nickel and zinc.

11. A process as described in claim 7 wherein the step of separating said co-precipitated material from the liquid phase is performed in a centrifuge and decanting the supernatant liquid.

12. A process as described in claim 7 wherein the step of milling the calcined powder is performed using a polyurethane lined vibro-energy mill containing dense zirconium dioxide pellets.

13. A wet process for producing a ferrite powder comprising the steps of:

dissolving in an acid, pure metals of iron and zinc and one other metal selected from the group consisting of Mn and Ni to form a metal ion solution;

heating said formed metal ion solution to approximately 50° C. or less;

providing a solution containing ammonium oxalate;

heating said ammonium oxalate solution to approximately 70° C.;

reacting said metal ion solution with said ammonium oxalate solution by adding the ammonium oxalate solution into the metal ion solution to co-precipitate metal oxalates;

controlling the co-precipitate solution to have a pH from between three to about four;

separating said co-precipitated material from the liquid phase;

washing the metal oxalate precipitate to remove excess ammonium oxalate and the acid contaminate;

drying said separated co-precipitated material;

calcining the co-precipitated material in a temperature of approximately 200° C. to convert the ferrous ions to ferric ions; and milling said calcined ferric material to form a fine powder.

14. The process of claim 13 wherein the divalent metal ions is nickel to form a nickel-zinc ferrite powder.

15. A process for making a ferrite powder comprising the steps of:

forming a solution of ammonium oxalate as a precipitating agent;

forming a metal ion solution from the aqueous metal sulfates of iron and zinc and one other metal selected from the group consisting of Mn and Ni;

heating said formed metal ion solution to approximately 50° C. or less;

adding the precipitating agent solution to the metal ion solution as a co-precipitation step;

separating the liquid from the metal oxalate precipitate;

washing the metal oxalate precipitate to remove excess ammonium oxalate and the acid contaminants;

drying the washed metal oxalate slurry;

calcining the dried metal oxalate slurry; and milling the calcined powder to form a fine ferrite powder.

16. A process as defined in claim 15 wherein the metal sulfates include the weight percentages of about 66 to about 72% $FeSO_4 \cdot 7H_2O$ about 16 to about 23% $ZnSO_4 \cdot 7H_2O$ about 5 to about 18% $NiSO_4 \cdot 6H_2O$.

17. A process as defined in claim 15 further including the steps of:

isostatically compacting said powder at an ambient temperature;

presintering said compacted powder; and hot isostatically pressing said powder to form a dense brick of ferrite material.

18. A process as defined in claim 15 wherein the step of calcining is performed at a temperature of approximately 200° C.

* * * * *